United States Patent
Lai et al.

(10) Patent No.: US 9,998,009 B1
(45) Date of Patent: Jun. 12, 2018

(54) SWITCH MODE POWER SUPPLY SUPPORTING BOTH A BI-DIRECTIONAL CONVERTER OF A FIRST CONFIGURATION AND THAT OF A SECOND CONFIGURATION

(71) Applicant: Monolithic Power Systems, Inc., San Jose, CA (US)

(72) Inventors: Pengjie Lai, San Jose, CA (US); Jian Jiang, Los Gatos, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days. days.

(21) Appl. No.: 15/425,820

(22) Filed: Feb. 6, 2017

(51) Int. Cl.
*H02M 3/158* (2006.01)
*H02M 3/157* (2006.01)

(52) U.S. Cl.
CPC ......... *H02M 3/1582* (2013.01); *H02M 3/157* (2013.01)

(58) Field of Classification Search
CPC ........ H02M 1/08; H02M 1/088; H02M 1/158; H02M 1/1582; H02M 3/155–3/158; H02M 2001/0045; H02M 2003/158
USPC .......................... 323/259, 271, 282–285, 351
See application file for complete search history.

(56) References Cited

U.S. PATENT DOCUMENTS

| | | | |
|---|---|---|---|
| 7,804,282 B2 * | 9/2010 | Bertele | H02M 3/1582 323/222 |
| 7,952,900 B2 * | 5/2011 | Tomiyoshi | H02M 3/1582 363/132 |
| 8,354,827 B2 * | 1/2013 | Werle | H02M 3/1582 323/224 |
| 8,643,351 B2 | 2/2014 | Lai et al. | |
| 8,693,276 B2 | 4/2014 | Lai et al. | |
| 8,723,490 B2 * | 5/2014 | Moussaoui | H02M 3/1588 323/259 |
| 9,769,889 B2 * | 9/2017 | Jiang | H05B 33/0815 |
| 2013/0169258 A1 * | 7/2013 | Lai | H02M 3/1582 323/311 |
| 2016/0374163 A1 * | 12/2016 | Jiang | H05B 33/0815 |
| 2017/0093271 A1 * | 3/2017 | Lai | H02M 1/088 |

* cited by examiner

*Primary Examiner* — Adolf Berhane
(74) *Attorney, Agent, or Firm* — Perkins Coie LLP (57) ABSTRACT

A switch mode power supply (SMPS) with control scheme selection for high-voltage configuration and low-voltage configuration of the SMPS. The SMPS operates in at least a charge state or a release state. The SMPS has a mode control module receiving a mode setting signal indicative of the configuration of the SMPS and a state indication signal indicative of the state of the SMPS. The SMPS selects a boost control module or a buck control module to control the SMPS according to the mode setting signal and the state indication signal.

21 Claims, 4 Drawing Sheets

SWITCH MODE POWER SUPPLY SUPPORTING BOTH A BI-DIRECTIONAL CONVERTER OF A FIRST CONFIGURATION AND THAT OF A SECOND CONFIGURATION

FIELD OF THE INVENTION

The present invention relates generally to power supply, and more particularly but not exclusively to switch mode power supply.

BACKGROUND OF THE INVENTION

In traditional switch mode power supply (SMPS) for supplying a bus voltage $V_{BS}$ to a downstream device, such as a DC/DC converter for supplying a solid state drive (SSD) device, a high-voltage capacitor rated for a relatively high voltage (e.g., higher than 10V) is generally used as a storage capacitor to store energy when a power source is provided to the SMPS and to release the stored energy when a predetermined condition is satisfied, for example, when the bus voltage $V_{BS}$ drops below a release threshold, for power backup. In such a configuration using a high-voltage capacitor as the storage capacitor, a boost control scheme is generally used to step up the power source $V_{IN}$ to a higher storage voltage $V_{STRG}$ across the high-voltage capacitor (e.g., $V_{IN}$=3.3V, $V_{STRG}$=20V), and a buck control scheme is generally used to step down the storage voltage $V_{STRG}$ across the high-voltage capacitor to the lower bus voltage $V_{BS}$ to supply the downstream device (e.g., $V_{STRG}$=20V, $V_{BS}$=3.3V).

As another type of capacitors, low-voltage capacitors, e.g., super capacitors, get more and more attention nowadays due to their variety of advantages, such as their excellent reliability performance, low cost, quick charge/discharge capability, etc. However, compared with the high-voltage capacitor, the low-voltage capacitor has a lower rated voltage (e.g., several volts for a single low-voltage capacitor), which requires that the power source $V_{IN}$ is stepped down to a lower storage voltage $V_{STRG}$ for the purpose of safe operation of the low-voltage capacitor (e.g., $V_{IN}$=12V, $V_{STRG}$=5V). Accordingly, when used to supply the downstream device, the lower storage voltage $V_{STRG}$ is stepped up to the higher bus voltage $V_{BS}$ (e.g., $V_{STRG}$=5V, $V_{BS}$=12V). As a result, the traditional control scheme for the configuration using the high-voltage capacitor as the storage capacitor is no longer applicable for the low-voltage configuration using a low-voltage capacitor as the storage capacitor.

Depending on different situations, the user may choose high-voltage capacitor or low-voltage capacitor as the storage capacitor. Thus, there is a need for a SMPS capable of being used for both high-voltage capacitor and low-voltage capacitor. And the SMPS in accordance with the present invention addresses at least the above-mentioned issue.

SUMMARY

Embodiments of the present invention are directed to a controller of a switch mode power supply (SMPS) for providing a bus voltage at a bus terminal. The SMPS comprises a bi-directional converter comprising a storage capacitor and an inductor. The bi-directional converter is capable of being configured in at least a first configuration or a second configuration. The state of the SMPS comprises at least a charge state to store energy in the storage capacitor and a release state to release energy from the storage capacitor. The controller comprises a mode control module, a buck control module and a boost control module. The mode control module receives a mode setting signal indicative of the configuration of the bi-directional converter and a state indication signal indicative of the state of the SMPS. The mode control module is configured to generate a mode control signal in response to the mode setting signal and the state indication signal. The buck control module and the boost control module are both coupled to the mode control module. In response to the mode control signal, the buck control module or the boost control module is selected to control the bi-directional converter to store energy in the storage capacitor or to release energy from the storage capacitor.

Embodiments of the present invention are also directed to a switch mode power supply (SMPS) for providing a bus voltage at a bus terminal. The state of the SMPS comprises at least a charge state and a release state. The SMPS comprises a bi-directional converter, a mode control module, a buck control module and a boost control module. The bi-directional converter comprises a high-side switch having a first terminal and a second terminal; a low-side switch having a first terminal and a second terminal, wherein the first terminal of the low-side switch is coupled to the second terminal of the high-side switch, and the second terminal of the low-side switch is grounded; an inductor coupled between the second terminal of the high-side switch and the bus terminal; and a storage capacitor having a first terminal and a second terminal, wherein the first terminal of the storage capacitor is coupled to the first terminal of the high-side switch, and the second terminal of the storage capacitor is grounded. The mode control module receives a mode setting signal indicative of the configuration of the bi-directional converter and a state indication signal indicative of the state of the SMPS. The mode control module is configured to generate a mode control signal in response to the mode setting signal and the state indication signal. The buck control module and the boost control module are both coupled to the mode control module. In response to the mode control signal, the boost control module is selected to control the bi-directional converter in the charge state, and the buck control module is selected to control the bi-directional converter in the release state.

Embodiments of the present invention are further directed to a switch mode power supply (SMPS) for providing a bus voltage at a bus terminal. The state of the SMPS comprises at least a charge state and a release state. The SMPS comprises a bi-directional converter, a mode control module, a buck control module and a boost control module. The bi-directional converter comprises a high-side switch having a first terminal and a second terminal, wherein the first terminal of the high-side switch is coupled to the bus terminal; a low-side switch having a first terminal and a second terminal, wherein the first terminal of the low-side switch is coupled to the second terminal of the high-side switch, and the second terminal of the low-side switch is grounded; an inductor having a first terminal and a second terminal, wherein the first terminal of the inductor is coupled to the second terminal of the high-side switch; and a storage capacitor having a first terminal and a second terminal, wherein the first terminal of the storage capacitor is coupled to the second terminal of the inductor, and the second terminal of the storage capacitor is grounded. The mode control module receives a mode setting signal indicative of the configuration of the bi-directional converter and a state indication signal indicative of the state of the SMPS. The mode control module generates a mode control signal in response to the mode setting signal and the state indication signal. The buck control module and a boost control module are both coupled to the mode control module. In response to the mode control signal, the buck control module is selected to control the bi-directional converter in the charge state, and the boost control module is selected to control the bi-directional converter in the release state.

Embodiments of the present invention are further directed to method for controlling a switch mode power supply (SMPS) comprising a bi-directional converter capable of being configured in at least a first configuration or a second configuration, wherein the state of the SMPS comprises at least a charge state and a release state, the method comprising: receiving a mode setting signal indicative of the configuration of the bi-directional converter; and selecting a boost control scheme to control the bi-directional converter for the release state and a buck control scheme to control the bi-directional converter for the charge state, or a buck control scheme to control the bi-directional converter for the release state and a boost control scheme to control the bi-directional converter for the charge state, in response to the mode setting signal.

Embodiments of the present invention are further directed to a method for controlling a switch mode power supply (SMPS). The state of the SMPS comprises at least a charge state and a release state. The method comprises forming a bi-directional converter with a high-voltage configuration; setting a mode control signal corresponding to the high-voltage configuration of the bi-directional converter; and selecting a boost control scheme to control the bi-directional converter when the SMPS is in the charge state and selecting a buck control scheme to control the bi-directional converter when the SMPS is in the release state.

Embodiments of the present invention are further directed to a method for controlling a switch mode power supply (SMPS). The state of the SMPS comprises at least a charge state and a release state. The method comprises forming a bi-directional converter with a low-voltage configuration; setting a mode control signal corresponding to the low-voltage configuration of the bi-directional converter; and selecting a buck control scheme to control the bi-directional converter when the SMPS is in the charge state and selecting a boost control scheme to control the bi-directional converter when the SMPS is in the release state.

DESCRIPTION OF THE DRAWINGS

The present invention can be further understood with reference to the following detailed description and the appended drawings, wherein like elements are provided with like reference numerals.

DESCRIPTION

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" may also include plural references. For example, depending on the specific design of a controller, "a mode control signal" or "the mode control signal" in the context of the present invention may refer to a single signal in one embodiment, or more than one signals in another embodiment. Similarly, "a state indication signal" or "the state indication signal" in the context of the present invention may refer to a single signal in one embodiment, such as in the embodiment of FIG. 4, or more than one signals in another embodiment, depending on the specific design of the controller.

Figure 1:
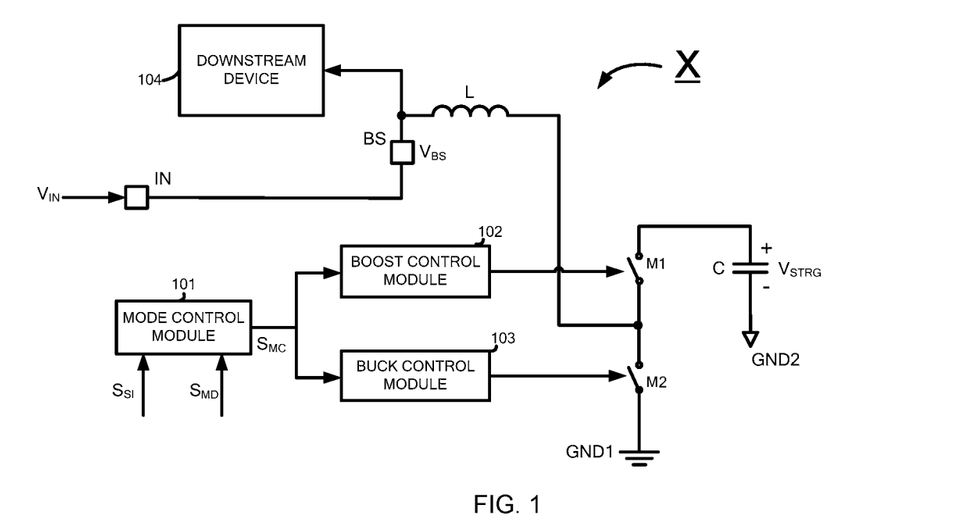
FIG. 1 illustrates a switch mode power supply X comprising a bi-directional converter of a first configuration in accordance with an embodiment of the present invention.
Figure 2:
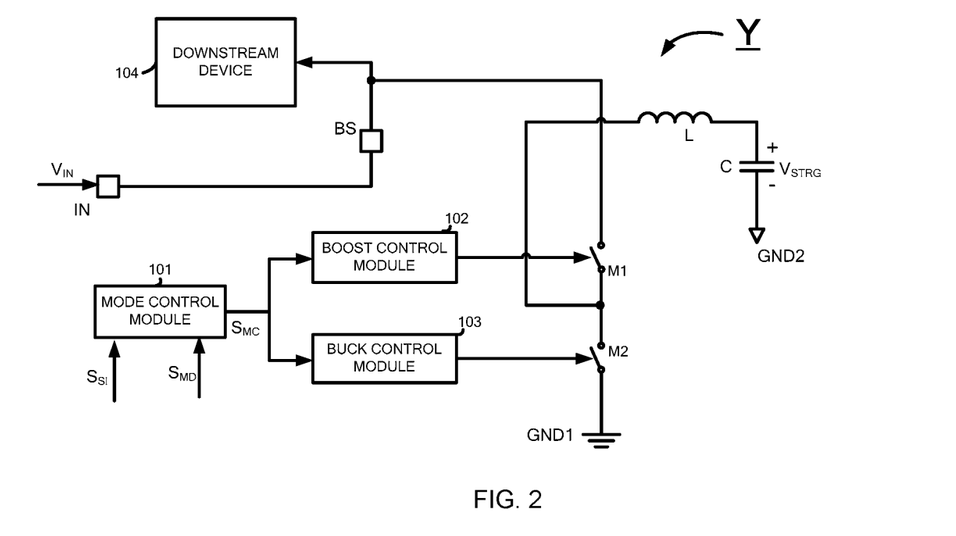
FIG. 2 illustrates a switch mode power supply Y comprising a bi-directional converter of a second configuration in accordance with an embodiment of the present invention.

FIG. 1 illustrates a switch mode power supply X comprising a bi-directional converter of a first configuration in accordance with an embodiment of the present invention. FIG. 2 illustrates a switch mode power supply Y comprising a bi-directional converter of a second configuration in accordance with an embodiment of the present invention. The switch mode power supply (SMPS) X of FIG. 1 and the SMPS Y of FIG. 2 has a similar configuration except that the bi-directional converter of the SMPS X is configured in the first configuration and the bi-directional converter of the SMPS Y is configured in the second configuration. Thus, regarding the same parts of the SMPSs X and Y, the related description will be given with reference to the SMPS X in FIG. 1, however, persons of ordinary skill in the art will recognize that the description applies to the SMPS Y too.

Now refer to FIG. 1, the SMPS X shown in FIG. 1 comprises a bus terminal BS where exits a bus voltage $V_{BS}$, and the SMPS X is configured to supply the bus voltage $V_{BS}$ at the bus terminal BS to a downstream device 104. In one embodiment, the downstream device 104 may comprise a DC/DC converter, e.g., a step-up converter, a step-down converter or a plurality of step-down converters, etc., for supplying a load, e.g., a solid state drive (SSD) or a hard disk drive (HDD), etc. However, persons of ordinary skill in the art will recognize that other embodiments may be contemplated with any other appropriate device employed as the downstream device, such as the flyback converter, buck-boost converter, etc. And further, other embodiments may be contemplated with any other appropriate type of load, such as any other appropriate type of drive device.

The SMPS X in FIG. 1 is illustrated to comprise a controller and a bi-directional converter comprising a storage capacitor C. When a power source $V_{IN}$ is provided, the SMPS X may operate in a charge state where the controller is configured to control the bi-directional converter to store energy in the storage capacitor C with the power source $V_{IN}$ until a storage voltage $V_{STRG}$ across the storage capacitor C reaches a predetermined storage value.

Meanwhile, when the power source $V_{IN}$ is provided, the SMPS X is configured to couple the power source $V_{IN}$ to the bus terminal BS and to generate the bus voltage $V_{BS}$ based on the power source $V_{IN}$. In the context of the present description, such coupling between the power source $V_{IN}$ and the bus terminal BS may refer to a direct or an indirect connection. As an example of the indirect connection, in one embodiment, the SMPS X may be further configured to comprise an input terminal IN as shown in FIG. 1 for receiving the power source $V_{IN}$, and a current limit circuit which may be coupled between the input terminal and the bus terminal to limit an input current flowing to the bus terminal when the input current is larger than a predetermined current threshold. As an example of the direction connection, in one embodiment, the power source $V_{IN}$ may be directly connected to the bus terminal BS and the bus voltage $V_{BS}$ may be equal to the power source $V_{IN}$.

On the other hand, the SMPS X of FIG. 1 may operate in a release state where the controller is configured to control the bi-directional converter to release energy from the storage capacitor C to the downstream device 104 and to generate the bus voltage $V_{BS}$ based on the storage voltage $V_{STRG}$ when a predetermined condition is satisfied. In this way, a backup power is provided to supply the downstream device 104 which helps to prevent unexpected loss due to the sudden power decrease.

Persons of ordinary skill in the art will recognize that the state of the SMPS X is illustrated to comprise the charge state and the release state as presented in the above description. However, the SMPS X may further comprise other states in some other embodiments. For example, the SMPS X may comprise a sleep state where the bi-directional converter stops storing energy in and releasing energy from the storage capacitor C to reduce power loss when the power source $V_{IN}$ is sufficient to supply the downstream device 104 and the storage voltage $V_{STRG}$ has reached the predetermined storage value. As another example, depending on a particular design of the SMPS, the SMPS may comprise a pre-charge state where the storage capacitor C is charged to a pre-charge threshold, e.g., the desired bus voltage $V_{BS}$, with a substantial constant current during the start-up of the power source $V_{IN}$, to avoid an input inrush current.

Persons of ordinary skill in the art will also recognize that the judgment of the state of the SMPS X may differ depending on different designs of the SMPS X and it should not be taken in a limited sense to limit the scope of the present invention. Just for example, in one embodiment, the SMPS X may be judged to operate in the release state when the power source $V_{IN}$ or the bus voltage $V_{BS}$ drops below a predetermined threshold. As another example, the SMPS X may be judged to operate in the charge state when the storage voltage $V_{STRG}$ is lower than the predetermined storage value and the power source $V_{IN}$ is provided.

Further refer to FIG. 1, the first configuration of the bi-directional converter of the SMPS X of FIG. 1 is illustrated to comprise a high-voltage configuration. In more detail, in the high-voltage configuration, the bi-directional converter of the SMPS X is illustrated to comprise a high-side switch M1 and a low-side switch M2. The high-side switch M1 and the low-side switch M2 each has a first terminal and a second terminal, wherein the first terminal of the low-side switch M2 is coupled to the second terminal of the high-side switch M1 and the second terminal of the low-side switch M2 is coupled to a first reference ground GND1 (e.g., an analog reference ground). Persons of ordinary skill in the art will recognize that the high-side switch M1 or the low-side switch M2 may be integrated together with the controller in the same chip or be externally coupled to the chip integrating the controller, depending on the different designs.

With continuing reference to FIG. 1, in the high-voltage configuration, the bi-directional converter of the SMPS X is further configured to comprise an inductor L and the storage capacitor C with each having a first terminal and a second terminal, wherein the first terminal of the inductor L is coupled to the second terminal of the high-side switch M1 and the first terminal of the low-side switch M2 and the second terminal of the inductor L is coupled to the bus terminal BS, the first terminal of the storage capacitor C is coupled to a second reference ground GND2 (e.g., a power reference ground) and the second terminal of the storage capacitor C is coupled to the first terminal of the high-side switch M1.

Now turn to FIG. 2, as mentioned above, the SMPS Y of FIG. 2 has a similar configuration as that of the SMPS X of FIG. 1 except that the bi-directional converter of the SMPS Y is configured in a second configuration. More information will now be set forth regarding the second configuration of the bi-directional converter of the SMPS Y.

As shown in FIG. 2, the second configuration of the bi-directional converter of the SMPS Y of FIG. 2 is illustrated to comprise a low-voltage configuration. In the low-voltage configuration, the bi-directional converter of the SMPS Y is also illustrated to comprise a high-side switch M1 and a low-side switch M2. The high-side switch M1 and the low-side switch M2 each has a first terminal and a second terminal, wherein the first terminal of the low-side switch M2 is coupled to the second terminal of the high-side switch M1 and the second terminal of the low-side switch M2 is coupled to a first reference ground GND1 (e.g., an analog reference ground).

Persons of ordinary skill in the art will recognize that the high-side switch M1 or the low-side switch M2 may be integrated together with the controller in the same chip or be externally coupled to the chip integrating the controller, depending on the different designs.

Further, in the low-voltage configuration, the bi-directional converter of the SMPS Y is configured to comprise an inductor L and the storage capacitor C with each having a first terminal and a second terminal, wherein the first terminal of the inductor L is coupled to the second terminal of the high-side switch M1 and the first terminal of the low-side switch M2, the first terminal of the storage capacitor C is coupled to a second reference ground GND2 (e.g., a power reference ground) and the second terminal of the storage capacitor C is coupled to the second terminal of the inductor L, and the first terminal of the high-side switch M1 is coupled to the bus terminal BS, such as through a direct connection.

FIG. 1 and FIG. 2 illustrate a controller capable of being configured to control both a bi-directional converter with a first configuration and a bi-directional converter with a second configuration. Persons of ordinary skill in the art will recognize that the controller in the present invention may be configured to control other configurations of the bi-directional converter in addition to the presented first and second configurations in other embodiments. Further, the first configuration and the second configuration of the bi-directional converters are respectively illustrated to comprise a high-voltage configuration and a low-voltage configuration as shown in FIG. 1 and FIG. 2. Persons of ordinary skill in the art will understand that the first configuration and the second configuration represent two different configurations of the SMPS and should be not taken in a limited way, other embodiments may be contemplated with any other appropriate configurations. Furthermore, the terms "high-voltage configuration" and "low-voltage configuration" do not necessarily imply that the voltage of the high-voltage configuration is higher than the voltage of the low-voltage configuration. However, persons of ordinary skill in the art will also recognize that in one embodiment, the high-voltage configuration may comprise a high-voltage capacitor rated for a relatively high voltage as a storage capacitor and a low-voltage configuration may comprise a low-voltage capacitor rated for relatively low voltage as a storage capacitor.

Now refer to FIG. 1 and FIG. 2, the controller of FIG. 1 and FIG. 2 is illustrated to comprise a mode control module 101, a boost control module 102 and a buck control module 103. The mode control module 101 is configured to receive a mode setting signal $S_{MD}$ indicative of the configuration of the bi-directional converter. Regarding the mode setting signal $S_{MD}$, in one embodiment, it may be set by users, as a specific example, when the bi-directional converter is configured in the first configuration, the user may set the mode setting signal $S_{MD}$ at a first logic state, e.g., 1, while the user may set the mode setting signal $S_{MD}$ at a second logic state, e.g., 0, when the bi-directional converter is configured in the second configuration. In yet another embodiment, the mode setting signal $S_{MD}$ may be generated by detecting the configuration of the bi-directional converter with the controller itself. The mode control module 101 is further configured to receive a state indication signal $S_{SI}$ indicative of the state of the SMPS X. In one embodiment, a first logic state (e.g., 1) of the state indication signal $S_{SI}$ may indicate that the SMPS X is at the charge state where the storage capacitor C is charged by the power source $V_{IN}$, and a second logic state (e.g., 0) of the state indication signal $S_{SI}$ may indicate that the SMPS X is at the release state where the storage capacitor C releases its energy to supply the downstream device 104. Based on the received mode setting signal $S_{MD}$ and the state indication signal $S_{SI}$, the mode control module 101 is configured to generate a mode control signal $S_{MC}$.

The boost control module 102 and the buck control module 103 are both coupled to the mode control module 101. In response to the mode control signal $S_{MC}$, the boost control module 102 or the buck control module 103 is selected to control the bi-directional converter to store energy in the storage capacitor C or to release energy from the storage capacitor C, by controlling the switching actions of the high-side switch M1 and the low-side switch M2. In some embodiments, the boost control module 102 and the buck control module 103 can be combined with the charge state and the release state in any form. That is, when any one of the boost control module 102 and the buck control module 103 is selected to store energy in the storage capacitor C, the other one is selected to release energy from the storage capacitor C.

In a particular embodiment, when the mode setting signal $S_{MD}$ indicates that the bi-directional converter is configured in the high-voltage configuration as shown in FIG. 1, the boost control module 102 is selected by the mode control signal $S_{MC}$ to control the bi-directional converter when the SMPS X is at the charge state, and the buck control module 103 is selected by the mode control signal $S_{MC}$ to control the bi-directional converter when the SMPS X is at the release state. While when the mode setting signal $S_{MD}$ indicates that the bi-directional converter is configured in the low-voltage configuration as shown in FIG. 2, the buck control module 103 is selected by the mode control signal $S_{MC}$ to control the bi-directional converter when the SMPS X is at the charge state, and the boost control module 102 is selected by the mode control signal $S_{MC}$ to control the bi-directional converter when the SMPS X is at the release state.

In the present invention, by setting the mode setting signal $S_{MD}$ at different values, different control schemes can be selected for different configurations of the bi-directional converter. In this way, depending on a user's desire, the controller presented in the present invention can be used for at least two different configurations of the bi-directional converters. As a specific example, depending on a user's desire, the controller presented in the present invention can be used for the high-voltage configuration as well as for the low-voltage configuration such as a low-voltage configuration using a low-voltage capacitor as the storage capacitor, which can improve the reliability of the SMPS and reduce the cost.

Figure 3:
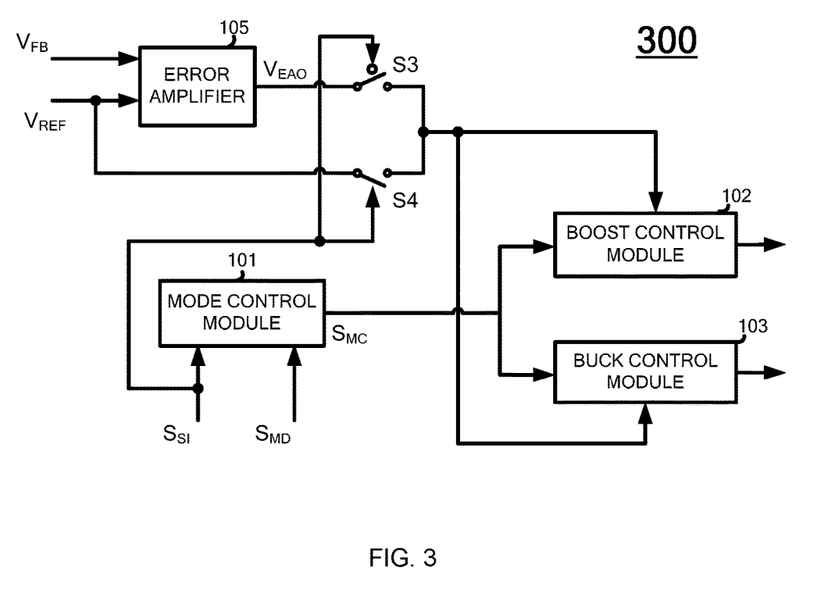
FIG. 3 illustrates a controller 300 capable of being used in both the SMPS X of FIG. 1 and the SMPS Y of FIG. 2 in accordance with an embodiment of the present invention.

FIG. 3 illustrates a controller 300 capable of being used in both the SMPS X of FIG. 1 and the SMPS Y of FIG. 2 in accordance with an embodiment of the present invention. As shown in FIG. 3, compared with the controller presented in the embodiments of FIG. 1 and FIG. 2, the controller 300 of FIG. 3 is illustrated to further comprise an error amplifier 105 having a first input terminal, a second input terminal and an output terminal. The error amplifier 105 is configured to receive a feedback signal $V_{FB}$ representative of the bus voltage $V_{BS}$ at the first input terminal and a reference signal $V_{REF}$ at the second input terminal. Based on the feedback signal $V_{FB}$ and the reference signal $V_{REF}$, the error amplifier 105 is configured to generate an error signal $V_{EAO}$ at the output terminal. The error signal $V_{EAO}$ is provided to the boost control module 102 and the buck control module 103 when they operate in the release state to keep the bus voltage $V_{STRG}$ at the desired level. Otherwise, the reference signal $V_{REF}$ is provided to the boost control module 102 and the buck control module 103 when they operate in the charge state to generate a constant current to charge the storage capacitor C so as to ensure the lifetime of the storage capacitor C.

As shown in FIG. 3, the controller 300 may further comprise a release switch S3 and a charge switch S4. The release switch S3 has a first terminal, a second terminal and a control terminal. The first terminal of the release switch S3 is coupled to the output terminal of the error amplifier 105, the second terminal of the release switch S3 is coupled to the buck control module 103 and the boost control module 102, and the control terminal of the release switch S3 is configured to receive an inverted signal of the state indication signal $S_{SI}$. The charge switch S4 has a first terminal, a second terminal and a control terminal. The first terminal of the charge switch S4 is configured to receive the reference signal $V_{REF}$, the second terminal of the charge switch S4 is coupled to the buck control module 103 and the boost control module 102, and the control terminal of the charge switch S4 is configured to receive the state indication signal $S_{SI}$. In this way, when the state indication signal $S_{SI}$ is set as $S_{SI}=1$ to indicate that the SMPS operates in the charge state, the reference signal $V_{REF}$ is provided to the buck control module 103 and the boost control module 102. While the state indication signal $S_{SI}$ is set as $S_{SI}=0$ to indicate that the SMPS operates in the release state, the error signal $V_{EAO}$ is provided to the buck control module 103 and the boost control module 102.

Figure 4:
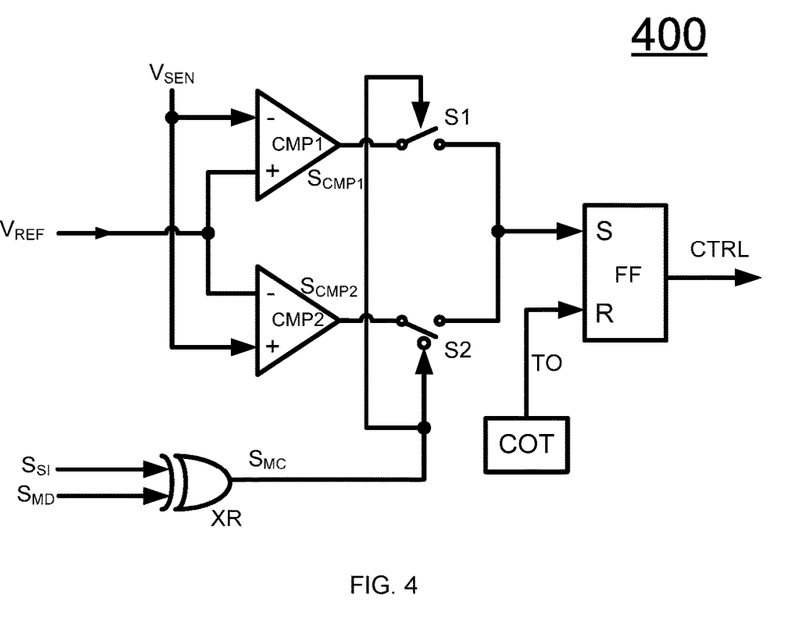
FIG. 4 illustrates an exemplary controller 400 capable of being used in both the SMPS X of FIG. 1 and the SMPS Y of FIG. 2 in accordance with an embodiment of the present invention.

FIG. 4 illustrates an exemplary controller 400 capable of being used in both the SMPS X of FIG. 1 and the SMPS Y of FIG. 2 in accordance with an embodiment of the present invention. As shown in FIG. 4, the controller 400 is illustrated to comprise a mode control module configured to receive a mode setting signal $S_{MD}$ indicative of the configuration of the bi-directional converter of the SMPS X or of the SMPS Y. The mode control module is further configured to receive a state indication signal $S_{SI}$ indicative of the state of the SMPS X or the SMPS Y. It should be understood that, when applying the controller 400 in the SMPS X or the SMPS Y, a logic high state ($S_{MD}=1$) and a logic low state ($S_{MD}=0$) of the mode setting signal $S_{MD}$ are respectively set to indicate the high-voltage configuration of the bi-directional converter of the SMPS X and the low-voltage configuration of the bi-directional converter of the SMPS Y, while a logic high state ($S_{SI}=1$) and a logic low state ($S_{SI}=0$) of the state indication signal $S_{SI}$ are respectively set to indicate the charge state and the release state of the SMPS X or the SMPS Y. In response to the mode setting signal $S_{MD}$ and the state indication signal $S_{SI}$, the mode control module is configured to generate a mode control signal $S_{MC}$.

In more detail, the mode control module of FIG. 4 is illustrated to comprise an XOR gate XR, a buck switch S1 and a boost switch S2. The XOR gate XR has a first input terminal, a second input terminal and an output terminal. The XOR gate XR is configured to receive the state indication signal $S_{SI}$ at the first input terminal and the mode setting signal $S_{MD}$ at the second input terminal, and to generate the mode control signal $S_{MC}$ at the output terminal. Each of the buck switch S1 and the boost switch S2 has a first terminal, a second terminal and a control terminal. The buck switch S1 and the boost switch S2 are configured to respectively receive the mode control signal $S_{MC}$, and an inverted signal of the mode control signal $S_{MC}$ at their control terminals to select a buck control module or a boost control module which will be elaborated below, to control the bi-directional converter of the SMPS X or of the SMPS Y.

With continuing reference to FIG. 4, the controller 400 is illustrated to comprise a buck comparator CMP1, a boost comparator CMP2, an on-time generating circuit COT and a flip-flop FF. The buck comparator CMP1 has a first input terminal (e.g., an inverting terminal), a second input terminal (e.g., a non-inverting terminal) and an output terminal. The first input terminal of the buck comparator CMP1 is coupled to a current sense signal $V_{SEN}$ representative of the current flowing through the inductor L. More specifically, the current sense signal $V_{SEN}$ is representative the current flowing through the low-side switch M2. The second input terminal is coupled to a reference signal $V_{REF}$. The buck comparator CMP1 is configured to generate a buck comparison signal $S_{CMP1}$ at the output terminal by comparing the signals received at the first and second input terminals. The output terminal of the buck comparator CMP1 is coupled to the first terminal of the buck switch S1.

The boost comparator CMP2 has a first input terminal (e.g., an inverting terminal), a second input terminal (e.g., a non-inverting terminal) and an output terminal. The first input terminal of the boost comparator CMP2 is coupled to the reference signal $V_{REF}$, and the second input terminal of the boost comparator CMP2 is coupled to the current sense signal $V_{SEN}$. The boost comparator CMP2 is configured to generate a boost comparison signal $S_{CMP2}$ at the output terminal by comparing the signals received at the first and second input terminals. The output terminal of the boost comparator CMP2 is coupled to the first terminal of the boost switch S2.

The flip-flop FF has a set terminal, a reset terminal and an output terminal. The set terminal is coupled to the second terminals of the buck switch S1 and of the boost switch S2. The reset terminal is coupled to the on-time generating circuit COT to receive an on-time signal TO. Based on the signals received at the set terminal and at the reset terminal, the flip-flop is configured to generate a control signal CTRL at the output terminal to control the bi-directional converter of the SMPS X or the SMPS Y.

Thus, as shown, the buck control module utilizing a valley current mode control is formed by at least the buck comparator CMP1, the on-time generating circuit COT and the flip-flop FF in the controller 400 of FIG. 4. And the boost control module utilizing a peak current mode control is formed by at least the boost comparator CMP2, the on-time generating circuit COT and the flip-flop FF in the controller 400 of FIG. 4.

In operation, when the controller 400 is used in the SMPS X of FIG. 1 with the bi-directional converter configured in the high-voltage configuration, the mode setting signal $S_{MD}$ is set as $S_{MD}=1$. If the state indication signal $S_{SI}$ indicates that the SMPS X operates in the charge state, i.e. $S_{SI}=1$, the XOR gate XR outputs $S_{MC}=0$ to turn on the boost switch S2 and to turn off the buck switch S1, which in turn delivers the boost comparison signal $S_{CMP2}$ to set the flip-flop FF. The boost comparison signal $S_{CMP2}$ and the on-time signal TO operate alternately to set and to reset the flip-flop FF so as to switch the high-side switch M1 and the low side switch M2 of the SMPS X. In this way, the boost control module comprising the boost comparator CMP2, the on-time generating circuit COT and the flip-flop FF is selected for the charge state in the high-voltage configuration. If the state indication signal $S_{SI}$ indicates that the SMPS X operates in the release state, i.e. $S_{SI}=0$, the XOR gate XR outputs $S_{MD}=1$ to turn on the buck switch S1 and to turn off the boost switch S2, which in turn delivers the buck comparison signal $S_{CMP1}$ to set the flip-flop FF. The buck comparison signal $S_{CMP1}$ and the on-time signal TO operate alternately to set and to reset the flip-flop FF so as to switch the high-side switch M1 and the low side switch M2 of the SMPS X. In this way, the buck control module comprising the buck comparator CMP1, the on-time generating circuit COT and the flip-flop FF is selected for the release state in the high-voltage configuration.

When the controller 400 is used in the SMPS Y of FIG. 2 with the bi-directional converter configured in the low-voltage configuration, the mode setting signal $S_{MD}$ is set as $S_{MD}=0$. If the state indication signal $S_{SI}$ indicates that the SMPS Y operates in the charge state, i.e. $S_{SI}=1$, the XOR gate XR outputs $S_{MC}=1$ to turn on the buck switch S1 and to turn off the boost switch S2, which in turn deliver the buck comparison signal $S_{CMP1}$ to set the flip-flop FF. The buck comparison signal $S_{CMP1}$ and the on-time signal TO operate alternately to set and to reset the flip-flop FF so as to switch the high-side switch M1 and the low side switch M2 of the SMPS Y. In this way, the buck control module comprising the buck comparator CMP1, the on-time generating circuit COT and the flip-flop FF is selected for the charge state in the low-voltage configuration. If the state indication signal $S_{SI}$ indicates that the SMPS Y operates in the release state, i.e. $S_{SI}=0$, the XOR gate XR outputs $S_{MC}=0$ to turn on the boost switch S2 and to turn off the buck switch S1, which in turn deliver the boost comparison signal $S_{CMP2}$ to set the flip-flop FF. The boost comparison signal $S_{CMP2}$ and the on-time signal TO operate alternately to set and to reset the flip-flop FF so as to switch the high-side switch M1 and the low side switch M2 of the SMPS Y. In this way, a boost control module comprising the boost comparator CMP2, the on-time generating circuit COT and the flip-flop FF is selected for the release state in the low-voltage configuration.

As can be observed from the above description regarding the operation of the controller 400, the controller 400 of the present invention is capable of selecting the buck control module or the boost control module to control the bi-directional converter according to the configuration of the bi-directional converter which is indicated by the mode setting signal $S_{MD}$ and the state of the SMPS which is indicated by the indication signal $S_{SI}$. Thus, the controller 400 of the present invention provides the users more choices of selecting either the high-voltage capacitor or the low-voltage capacitor as the storage capacitor according to their desires.

Figure 5:
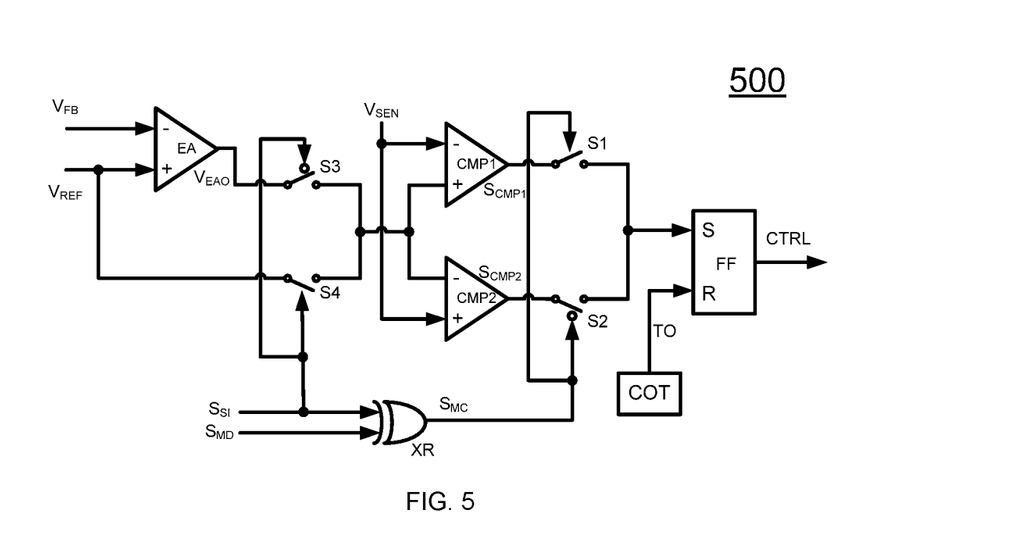
FIG. 5 illustrates another controller 500 capable of being used in both the SMPS X of FIG. 1 and the SMPS Y of FIG. 2 in accordance with an embodiment of the present invention.

FIG. 5 illustrates another controller 500 capable of being used in both the SMPS X of FIG. 1 and the SMPS Y of FIG. 2 in accordance with an embodiment of the present invention. The controller 500 has a similar configuration as that of the control 400 of FIG. 4 except that the controller 500 further comprises an error amplifier EA, a release switch S3 and a charge switch S4. Thus, the description regarding the parts of the controller 500 as same as that of the controller 400 will be omitted and only the different parts will be emphasized herein.

As shown in FIG. 5, the error amplifier EA has a first input terminal (e.g., an inverting terminal), a second input terminal (e.g., a non-inverting terminal) and an output terminal. The error amplifier EA is configured to receive a feedback signal $V_{FB}$ representative of the bus voltage $V_{BS}$ at the bus terminal BS of the SMPS X or the SMPS Y at the first input terminal and a reference signal $V_{REF}$ at the second input terminal. The error amplifier EA amplifies a difference between the reference signal $V_{REF}$ and the feedback signal $V_{FB}$ and generates an error signal $V_{EAO}$ at the output terminal. The output terminal of the error amplifier EA is coupled to the first terminal of the release switch S3. Coupled to the first terminal of the charge switch S4 is the reference signal $V_{REF}$. The second terminals of the release switch S3 and of the charge switch S4 are coupled together and further coupled to the second terminal of the buck comparator CMP1 and to the first terminal of the boost comparator CMP2, to deliver the reference signal $V_{REF}$ at the charge state of the SMPS X or the SMPS Y, and to deliver the error signal $V_{EAO}$ at the release state of the SMPS X or the SMPS Y.

In operation, when $S_{MD}=1$ and $S_{s1}=1$, the charge switch S4 is turned on while the release switch S3 is turned off to deliver the reference signal $V_{REF}$ to the boost comparator CMP2 for the charge state in the high-voltage configuration. When $S_{MD}=1$ and $S_{SI}=0$, the release switch S3 is turned on while the charge switch S4 is turned off to deliver the error signal $V_{EAO}$ to the buck comparator CMP1 for the release state in the high-voltage configuration. When $S_{MD}=0$ and $S_{SI}=1$, the charge switch S4 is turned on while the release switch S3 is turned off to deliver the reference signal $V_{REF}$ to the buck comparator CMP1 for the charge state in the low-voltage configuration. When $S_{MD}=0$ and $S_{SI}=0$, the release switch S3 is turned on while the charge switch S4 is turned off to deliver the error signal $V_{EAO}$ to the boost comparator CMP2 for the release state in the low-voltage configuration.

In this way, when storing energy in the storage capacitor C at the charge state, a constant charge current is provided by delivering the reference signal $V_{REF}$ to the downstream circuits, which helps to ensure the lifetime of the storage capacitor C. While when releasing energy from the storage capacitor C at the release state, the bus storage $V_{BS}$ may be kept at the desired level by delivering the error $V_{EAO}$ to the downstream circuits.

Figure 6:
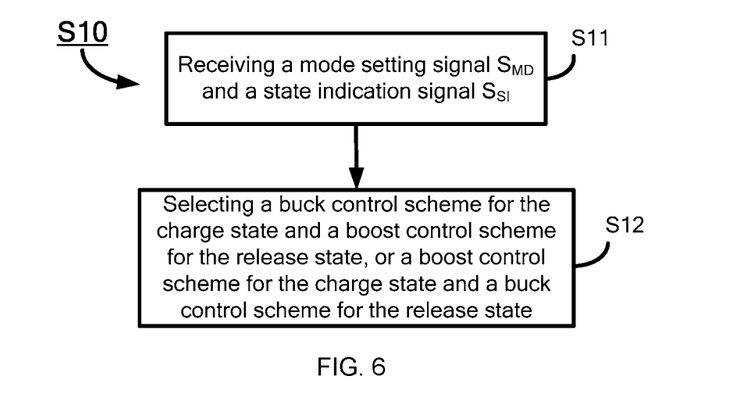
FIG. 6 illustrates a method S10 for controlling a switch mode power supply (SMPS) for providing a bus voltage at a bus terminal to a downstream device in accordance with an embodiment of the present invention.

FIG. 6 illustrates a method S10 for controlling a switch mode power supply (SMPS) for providing a bus voltage at a bus terminal to a downstream device in accordance with an embodiment of the present invention. The state of the SMPS comprises at least a charge state and a release state. The method S10 in FIG. 6 is illustrated to comprise steps S11, S12 and S13. In step S11, a mode setting signal indicative of the configuration of the bi-directional convertor is received. In step S12, in response to the mode setting signal, it is performed to select a boost control scheme to control the bi-directional converter for the release state and a buck control scheme to control the bi-directional converter for the charge state, or to select a buck control scheme to control the bi-directional converter for the release state and a boost control scheme to control the bi-directional converter for the charge state. In one embodiment, the step S11 may further comprise receiving a state indication signal indicative of the state of the SMPS and the step S12 may further comprise selecting the boost control scheme or the buck control scheme to control the bi-directional converter in response to the mode setting signal and the state indication signal.

More specifically in step S12, it is performed to select the buck control scheme for the charge state and the boost control scheme for the release state when the bi-directional converter is configured in the low-voltage configuration, and to select the boost control scheme for the charge state and the buck control scheme for the release state when the bi-directional converter is configured in the high-voltage configuration.

Figure 7:
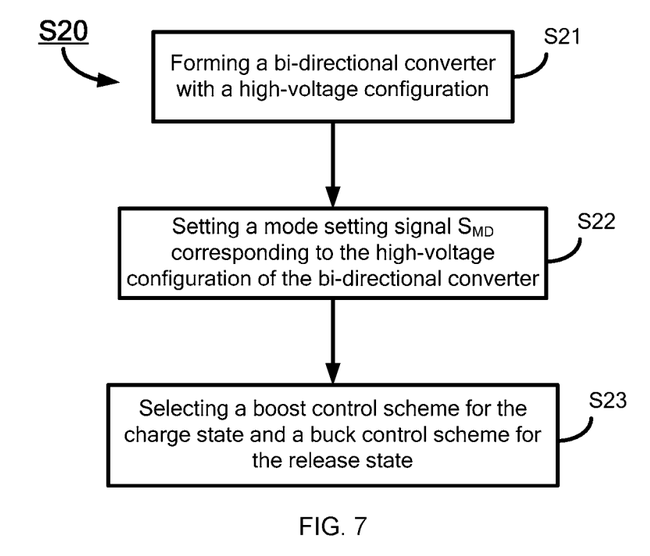
FIG. 7 illustrates a method S20 for controlling a switch mode power supply (SMPS) for providing a bus voltage at a bus terminal to a downstream device in accordance with an embodiment of the present invention.

FIG. 7 illustrates a method S20 for controlling a switch mode power supply (SMPS) for providing a bus voltage at a bus terminal to a downstream device in accordance with an embodiment of the present invention. The state of the SMPS comprises at least a charge state and a release state. The method S20 in FIG. 7 is illustrated to comprise steps S21, S22 and S23. In step S21, a bi-directional converter with a high-voltage configuration is formed with a high-voltage capacitor. In particular, the bi-directional converter is illustrated to comprise a high-side switch M1, a low-side switch M2, an inductor L and a storage capacitor C. The step S21 is implemented by coupling the low-side switch M2 between a second terminal of the high-side switch M1 and a first reference ground, the high-voltage capacitor between a first terminal of the high-side switch M1 and a second reference ground, and the inductor L between the second terminal of the high-side switch M1 and the bus terminal.

In step S22, a mode setting signal $S_{MD}$ is set at a first logic state, such as logic 1, corresponding to the high-voltage configuration of the bi-directional converter.

While in step S23, a boost control scheme is selected to control the bi-directional converter for the charge state and a buck control scheme is selected to control the bi-directional converter for the release state. In one embodiment, the boost control scheme may be implemented with a peak current control mode and the buck control scheme may be implemented with a valley current control mode.

Figure 8:
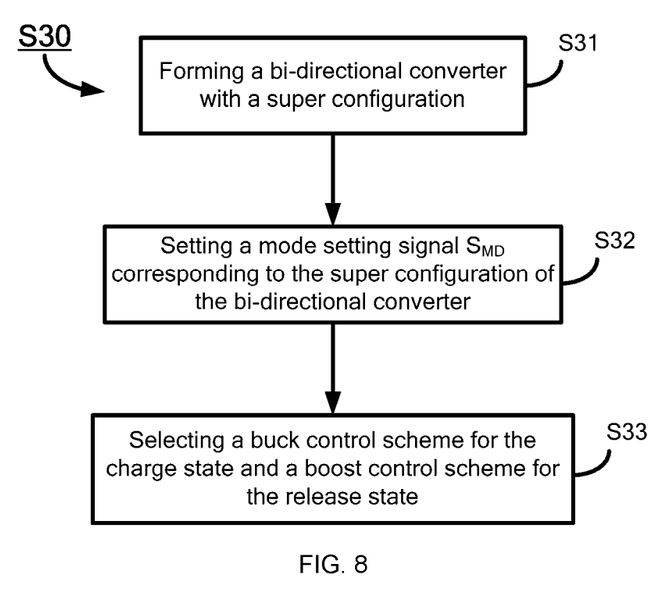
FIG. 8 illustrates a method S30 for controlling a switch mode power supply (SMPS) for providing a bus voltage at a bus terminal to a downstream device in accordance with an embodiment of the present invention.

FIG. 8 illustrates a method S30 for controlling a switch mode power supply (SMPS) for providing a bus voltage at a bus terminal to a downstream device in accordance with an embodiment of the present invention. The state of the SMPS comprises at least a charge state and a release state. The method S30 in FIG. 8 is illustrated to comprise steps S31, S32 and S33. In step S31, a bi-directional converter with a low-voltage configuration is formed with a low-voltage capacitor. In particular, the bi-directional converter is illustrated to comprise a high-side switch M1, a low-side switch M2, an inductor L and a storage capacitor C. The step S31 is implemented by coupling the low-side switch M2 between a second terminal of the high-side switch M1 and a first reference ground, a first terminal of the inductor L to a first terminal of the high-side switch M1, the low-voltage capacitor between a second terminal of the inductor L and a second reference ground, and the bus terminal to the second terminal of the high-side switch M1.

In step S32, a mode setting signal $S_{MD}$ is set at a second logic state, such as logic 0, corresponding to the low-voltage configuration of the bi-directional converter.

While in step S33, a buck control scheme is selected to control the bi-directional converter for the charge state and a boost control scheme is selected to control the bi-directional converter for the release state. In one embodiment, the boost control scheme may be implemented with a peak current control mode and the buck control scheme may be implemented with a valley current control mode.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

What is claimed is:

1. A controller of a switch mode power supply (SMPS) having an input terminal to receive a power source and a bus terminal to provide a bus voltage to a downstream device, wherein the SMPS comprises a bi-directional converter comprising a storage capacitor and an inductor, the bi-directional converter is capable of being configured in at least a first configuration or a second configuration, and when the power source is provided, the SMPS operates in a charge state to store energy in the storage capacitor, and when a predetermined condition is satisfied, the SMPS operates in a release state to release energy from the storage capacitor to the downstream device, the controller comprising:
   a mode control module configured to receive a mode setting signal indicative of the configuration of the bi-directional converter and a state indication signal indicative of the state of the SMPS, wherein the mode control module is configured to generate a mode control signal in response to the mode setting signal and the state indication signal; and
   a buck control module and a boost control module both coupled to the mode control module, wherein in response to the mode control signal 1) the buck control module is selected to control the bi-directional converter in the charge state and the boost control module is selected to control the bi-directional converter in the release state, or 2) the boost control module is selected to control the bi-direction converter in the charge state and the buck control module is selected to control the bi-directional converter in the release state.

2. The controller of claim 1, wherein the first configuration comprises a high-voltage configuration and the second configuration comprises a low-voltage configuration, and wherein in the low-voltage configuration, the buck control module is selected for the charge state and the boost control module is selected for the release state, and wherein in the high-voltage configuration, the boost control module is selected for the charge state and the buck control module is selected for the release state.

3. The controller of claim 2, wherein the bi-directional converter comprises:
   a high-side switch having a first terminal and a second terminal;
   a low-side switch having a first terminal and a second terminal, wherein the first terminal of the low-side switch is coupled to the second terminal of the high-side switch and the second terminal of the low-side switch is grounded;
   the inductor having a first terminal and a second terminal, wherein the first terminal of the inductor is coupled to the second terminal of the high-side switch; and
   the storage capacitor having a first terminal and a second terminal, wherein the first terminal of the storage capacitor is grounded;
   wherein the bi-directional converter is configured in the high-voltage configuration when the second terminal of the inductor is coupled to the bus terminal and the second terminal of the storage capacitor is coupled to the first terminal of the high-side switch; and
   wherein the bi-directional converter is configured in the low-voltage configuration when the second terminal of the storage capacitor is coupled to the second terminal of the inductor and the first terminal of the high-side switch is coupled to the bus terminal.

4. The controller of claim 2, wherein the storage capacitor comprises a high-voltage capacitor when the SMPS is configured in the high-voltage configuration, and the storage capacitor comprises a low-voltage capacitor when the SMPS is configured in the low-voltage configuration.

5. The controller of claim 2, wherein the controller comprises:
   a buck comparator having a first input terminal, a second input terminal and an output terminal, wherein the first input terminal of the buck comparator is coupled to a current sense signal representative of a current flowing through the inductor, the second input terminal of the buck comparator is coupled to a reference signal, and wherein the buck comparator is configured to generate a buck comparison signal based on the current sense signal and the reference signal;
   a boost comparator having a first input terminal, a second input terminal and an output terminal, wherein the first input terminal of the boost comparator is coupled to the reference signal and the second input terminal of the boost comparator is coupled to the current sense signal, and wherein the boost comparator is configured to generate a boost comparison signal based on the current sense signal and the reference signal;

an on-time generating circuit configured to generate an on-time signal; and
a flip-flop having a set terminal, a reset terminal and an output terminal, wherein the set terminal is selectively coupled to the output terminal of the buck comparator or the output terminal of the boost comparator to receive the buck comparison signal or the boost comparison signal, the reset terminal is coupled to the on-time generating circuit to receive the on-time signal, the flip-flop is configured to generate a control signal at the output terminal to control the bi-directional converter;
wherein the buck control module comprises the buck comparator, the on-time generating circuit and the flip-flop, and the boost control module comprises the boost comparator, the on-time generating circuit and the flip-flop.

6. The controller of claim 5, wherein the mode control module comprise:
an XOR gate having a first input terminal, a second input terminal and an output terminal, wherein the XOR gate is configured to receive the state indication signal at the first input terminal and the mode setting signal at the second input terminal, and to generate the mode control signal at the output terminal based on the state indication signal and the mode setting signal;
a buck switch having a first terminal, a second terminal and a control terminal, wherein the first terminal of the buck switch is coupled to the output terminal of the buck comparator, the second terminal of the buck switch is coupled to the set terminal of the flip-flop, and the control terminal of the buck switch is coupled to the output terminal of the XOR gate to receive the mode control signal; and
a boost switch having a first terminal, a second terminal and a control terminal, wherein the first terminal of the boost switch is coupled to the output terminal of the boost comparator, the second terminal of the boost switch is coupled to the set terminal of the flip-flop, and the control terminal of the boost switch is coupled to the output terminal of the XOR gate to receive an inverted signal of the mode control signal.

7. The controller of claim 1, wherein the controller further comprises an error amplifier having a first input terminal, a second input terminal and an output terminal, wherein the error amplifier is configured to receive a feedback signal representative of the bus voltage at the first input terminal and a reference signal at the second input terminal, and to generate an error signal at the output terminal, and wherein the error signal is provided to the buck control module or the boost control module for the release state, and the reference signal is provided to the buck control module or the boost control module for the charge state.

8. The controller of claim 7, wherein the controller further comprises:
a release switch having a first terminal, a second terminal and a control terminal, wherein the first terminal of the release switch is coupled to the output terminal of the error amplifier and the second terminal of the release switch is coupled to the buck control module and the boost control module, and the control terminal of the release switch is configured to receive an inverted signal of the state indication signal; and
a charge switch having a first terminal, a second terminal and a control terminal, wherein the first terminal of the charge switch is configured to receive the reference signal and the second terminal of the charge switch is coupled to buck control module and the boost control module, and the control terminal of the charge switch is configured to receive the state indication signal.

9. A switch mode power supply (SMPS) for providing a bus voltage at a bus terminal, wherein the state of the SMPS comprises at least a charge state and a release state, the SMPS comprising:
a bi-directional converter comprises:
a high-side switch having a first terminal and a second terminal;
a low-side switch having a first terminal and a second terminal, wherein the first terminal of the low-side switch is coupled to the second terminal of the high-side switch, and the second terminal of the low-side switch is grounded;
an inductor coupled between the second terminal of the high-side switch and the bus terminal; and
a storage capacitor having a first terminal and a second terminal, wherein the first terminal of the storage capacitor is coupled to the first terminal of the high-side switch, and the second terminal of the storage capacitor is grounded;
a mode control module configured to receive a mode setting signal indicative of the configuration of the bi-directional converter and a state indication signal indicative of the state of the SMPS, wherein the mode control module is configured to generate a mode control signal in response to the mode setting signal and the state indication signal; and
a buck control module and a boost control module both coupled to the mode control module, wherein in response to the mode control signal, the boost control module is selected to control the bi-directional converter in the charge state, and the buck control module is selected to control the bi-directional converter in the release state.

10. The SMPS of claim 9, wherein the SMPS comprises:
a buck comparator having a first input terminal, a second input terminal and an output terminal, wherein the first input terminal of the buck comparator is coupled to a current sense signal representative of a current flowing through the inductor, the second input terminal of the buck comparator is coupled to a reference signal, and wherein the buck comparator is configured to generate a buck comparison signal based on the current sense signal and the reference signal;
a boost comparator having a first input terminal, a second input terminal and an output terminal, wherein the first input terminal of the boost comparator is coupled to the reference signal and the second input terminal of the boost comparator is coupled to the current sense signal, and wherein the boost comparator is configured to generate a boost comparison signal based on the current sense signal and the reference signal;
an on-time generating circuit configured to generate an on-time signal; and
a flip-flop having a set terminal, a reset terminal and an output terminal, wherein the set terminal is selectively coupled to the output terminal of the buck comparator or the output terminal of the boost comparator to receive the buck comparison signal or the boost comparison signal, the reset terminal is coupled to the on-time generating circuit to receive the on-time signal, the flip-flop is configured to generate a control signal at the output terminal to control the bi-directional converter;

wherein the buck control module comprises the buck comparator, the on-time generating circuit and the flip-flop, and the boost control module comprises the boost comparator, the on-time generating circuit and the flip-flop.

11. The SMPS of claim 10, wherein the mode control module comprise:
an XOR gate having a first input terminal, a second input terminal and an output terminal, wherein the XOR gate is configured to receive the state indication signal at the first input terminal and the mode setting signal at the second input terminal, and to generate the mode control signal at the output terminal based on the state indication signal and the mode setting signal;
a buck switch having a first terminal, a second terminal and a control terminal, wherein the first terminal of the buck switch is coupled to the output terminal of the buck comparator, the second terminal of the buck switch is coupled to the set terminal of the flip-flop, and the control terminal of the buck switch is coupled to the output terminal of the XOR gate to receive the mode control signal; and
a boost switch having a first terminal, a second terminal and a control terminal, wherein the first terminal of the boost switch is coupled to the output terminal of the boost comparator, the second terminal of the boost switch is coupled to the set terminal of the flip-flop, and the control terminal of the boost switch is coupled to the output terminal of the XOR gate to receive an inverted signal of the mode control signal.

12. The SMPS of claim 9, wherein the SMPS further comprises:
an error amplifier having a first input terminal, a second input terminal and an output terminal, wherein the error amplifier is configured to receive a feedback signal representative of the bus voltage at the first input terminal and a reference signal at the second input terminal, and to generate an error signal at the output terminal;
a release switch having a first terminal, a second terminal and a control terminal, wherein the first terminal of the release switch is coupled to the output terminal of the error amplifier and the second terminal of the release switch is coupled to the buck control module and the boost control module, and the control terminal of the release switch is configured to receive an inverted signal of the state indication signal; and
a charge switch having a first terminal, a second terminal and a control terminal, wherein the first terminal of the charge switch is configured to receive the reference signal and the second terminal of the charge switch is coupled to buck control module and the boost control module, and the control terminal of the charge switch is configured to receive the state indication signal.

13. A switch mode power supply (SMPS) for providing a bus voltage at a bus terminal, wherein the state of the SMPS comprises at least a charge state and a release state, the SMPS comprising:
a bi-directional converter comprises:
a high-side switch having a first terminal and a second terminal, wherein the first terminal of the high-side switch is coupled to the bus terminal;
a low-side switch having a first terminal and a second terminal, wherein the first terminal of the low-side switch is coupled to the second terminal of the high-side switch, and the second terminal of the low-side switch is grounded;
an inductor having a first terminal and a second terminal, wherein the first terminal of the inductor is coupled to the second terminal of the high-side switch; and
a storage capacitor having a first terminal and a second terminal, wherein the first terminal of the storage capacitor is coupled to the second terminal of the inductor, and the second terminal of the storage capacitor is grounded;
a mode control module configured to receive a mode setting signal indicative of the configuration of the bi-directional converter and a state indication signal indicative of the state of the SMPS, wherein the mode control module is configured to generate a mode control signal in response to the mode setting signal and the state indication signal; and
a buck control module and a boost control module both coupled to the mode control module, wherein in response to the mode control signal, the buck control module is selected to control the bi-directional converter in the charge state, and the boost control module is selected to control the bi-directional converter in the release state.

14. The SMPS of claim 13, wherein the SMPS comprises:
a buck comparator having a first input terminal, a second input terminal and an output terminal, wherein the first input terminal of the buck comparator is coupled to a current sense signal representative of a current flowing through the inductor, the second input terminal of the buck comparator is coupled to a reference signal, and wherein the buck comparator is configured to generate a buck comparison signal based on the current sense signal and the reference signal;
a boost comparator having a first input terminal, a second input terminal and an output terminal, wherein the first input terminal of the boost comparator is coupled to the reference signal and the second input terminal of the boost comparator is coupled to the current sense signal, and wherein the boost comparator is configured to generate a boost comparison signal based on the current sense signal and the reference signal;
an on-time generating circuit configured to generate an on-time signal; and
a flip-flop having a set terminal, a reset terminal and an output terminal, wherein the set terminal is selectively coupled to the output terminal of the buck comparator or the output terminal of the boost comparator to receive the buck comparison signal or the boost comparison signal, the reset terminal is coupled to the on-time generating circuit to receive the on-time signal, the flip-flop is configured to generate a control signal at the output terminal to control the bi-directional converter;
wherein the buck control module comprises the buck comparator, the on-time generating circuit and the flip-flop, and the boost control module comprises the boost comparator, the on-time generating circuit and the flip-flop.

15. The SMPS of claim 14, wherein the mode control module comprise:
an XOR gate having a first input terminal, a second input terminal and an output terminal, wherein the XOR gate is configured to receive the state indication signal at the first input terminal and the mode setting signal at the second input terminal, and to generate the mode control signal at the output terminal based on the state indication signal and the mode setting signal;

a buck switch having a first terminal, a second terminal and a control terminal, wherein the first terminal of the buck switch is coupled to the output terminal of the buck comparator, the second terminal of the buck switch is coupled to the set terminal of the flip-flop, and the control terminal of the buck switch is coupled to the output terminal of the XOR gate to receive the mode control signal; and a boost switch having a first terminal, a second terminal and a control terminal, wherein the first terminal of the boost switch is coupled to the output terminal of the boost comparator, the second terminal of the boost switch is coupled to the set terminal of the flip-flop, and the control terminal of the boost switch is coupled to the output terminal of the XOR gate to receive an inverted signal of the mode control signal.

16. The SMPS of claim 13, wherein the SMPS further comprises:

an error amplifier having a first input terminal, a second input terminal and an output terminal, wherein the error amplifier is configured to receive a feedback signal representative of the bus voltage at the first input terminal and a reference signal at the second input terminal, and to generate an error signal at the output terminal;

a release switch having a first terminal, a second terminal and a control terminal, wherein the first terminal of the release switch is coupled to the output terminal of the error amplifier and the second terminal of the release switch is coupled to the buck control module and the boost control module, and the control terminal of the release switch is configured to receive an inverted signal of the state indication signal; and a charge switch having a first terminal, a second terminal and a control terminal, wherein the first terminal of the charge switch is configured to receive the reference signal and the second terminal of the charge switch is coupled to buck control module and the boost control module, and the control terminal of the charge switch is configured to receive the state indication signal.

17. A method for controlling a switch mode power supply (SMPS) comprising a bi-directional converter capable of being configured in at least a first configuration or a second configuration, wherein the state of the SMPS comprises at least a charge state and a release state, the method comprising:

receiving a mode setting signal indicative of the configuration of the bi-directional converter; and selecting a boost control scheme to control the bi-directional converter for the release state and a buck control scheme to control the bi-directional converter for the charge state, or a buck control scheme to control the bi-directional converter for the release state and a boost control scheme to control the bi-directional converter for the charge state, in response to the mode setting signal.

18. The method of claim 17, wherein the method further comprises:

receiving a state indication signal indicative of the state of the SMPS; and selecting the boost control scheme or the buck control scheme to control the bi-directional converter in response to the mode setting signal and the state indication signal.

19. The method of claim 17, wherein the first configuration comprises a high-voltage configuration and the second configuration comprises a low-voltage configuration, and wherein the selecting step of the method comprises selecting the buck control scheme for the charge state and the boost control scheme for the release state when the bi-directional converter is configured in the low-voltage configuration, and selecting the boost control scheme for the charge state and the buck control scheme for the release state when the bi-directional converter is configured in the high-voltage configuration.

20. A method for controlling a switch mode power supply (SMPS), wherein the state of the SMPS comprises at least a charge state and a release state, the method comprising:

forming a bi-directional converter with a high-voltage configuration;

setting a mode control signal corresponding to the high-voltage configuration of the bi-directional converter; and selecting a boost control scheme to control the bi-directional converter when the SMPS is in the charge state and selecting a buck control scheme to control the bi-directional converter when the SMPS is in the release state.

21. A method for controlling a switch mode power supply (SMPS), wherein the state of the SMPS comprises at least a charge state and a release state, the method comprising:

forming a bi-directional converter with a low-voltage configuration;

setting a mode control signal corresponding to the low-voltage configuration of the bi-directional converter; and selecting a buck control scheme to control the bi-directional converter when the SMPS is in the charge state and selecting a boost control scheme to control the bi-directional converter when the SMPS is in the release state.

* * * * *